(12) United States Patent
Balakrishnan et al.

(10) Patent No.: US 9,837,844 B2
(45) Date of Patent: Dec. 5, 2017

(54) REGULATION CIRCUIT HAVING ANALOG AND DIGITAL FEEDBACK AND METHOD THEREFOR

(71) Applicant: FREESCALE SEMICONDUCTOR, INC., Austin, TX (US)

(72) Inventors: Anandkumar Balakrishnan, Chandler, AZ (US); Venkata Devarakonda, Chandler, AZ (US); Meng Wang, Tempe, AZ (US)

(73) Assignee: NXP USA, Inc., Austin, TX (US)

( * ) Notice: Subject to any disclaimer, the term of this patent is extended or adjusted under 35 U.S.C. 154(b) by 113 days.

(21) Appl. No.: 15/063,559

(22) Filed: Mar. 8, 2016

(65) Prior Publication Data

US 2017/0264124 A1    Sep. 14, 2017

(51) Int. Cl.
   H02J 3/14    (2006.01)
   H02J 7/00    (2006.01)

(52) U.S. Cl.
   CPC .......... H02J 7/0068 (2013.01); H02J 7/0072 (2013.01)

(58) Field of Classification Search
   None
   See application file for complete search history.

(56) References Cited

U.S. PATENT DOCUMENTS

| 6,407,532 | B1 | 6/2002 | Ruha |
| 7,253,595 | B2 | 8/2007 | Oddoart et al. |
| 7,560,899 | B1 | 7/2009 | Potanin et al. |
| 7,570,035 | B2 * | 8/2009 | Kleveland ............... G05F 1/575 323/273 |
| 8,004,248 | B2 * | 8/2011 | Mayega ................ H02J 7/0072 320/141 |
| 2008/0061750 | A1 * | 3/2008 | Stoichita ............. H02M 3/1563 323/271 |
| 2010/0301811 | A1 | 12/2010 | Aiura |
| 2016/0006272 | A1 | 1/2016 | Greening |

* cited by examiner

Primary Examiner — Long Nguyen
(74) Attorney, Agent, or Firm — Daniel D. Hill

(57) ABSTRACT

A regulation circuit for powering a device while charging a battery is provided. The regulation circuit includes at least one analog feedback loop, and a digitally controlled feedback loop. The digitally controlled feedback loop includes first and second comparators. The first and second comparators compare an input power supply voltage to first and second threshold voltages, respectively. The second threshold voltage is lower than the first threshold voltage. In response to the comparisons, the digitally controlled feedback loop controls a charging current for charging a battery while also regulating a current to power circuits of the device. If the input power supply voltage drops, the digitally controlled feedback loop responds faster than the analog feedback loop, reducing the risk that to supply voltage will drop too much to reliably power to the device circuits. A method for digitally regulating an output current to charge a battery is also provided.

20 Claims, 3 Drawing Sheets

REGULATION CIRCUIT HAVING ANALOG AND DIGITAL FEEDBACK AND METHOD THEREFOR

BACKGROUND

Field

This disclosure relates generally to electronic circuits and more specifically to a regulation circuit having both analog feedback and digitally controlled feedback and method therefor.

Related Art

Many battery powered devices, such as mobile phones and tablets, include voltage regulation and battery charging circuitry for receiving a voltage from an external source for recharging a rechargeable battery. The external power source may provide power for powering the device in addition to charging the battery. The external power may be provided from various sources, for example, the external power may be in accordance with the universal serial bus (USB) standard. Some power sources have better current capacity and are regulated better than others. Also, the load being supplied can vary significantly. In a voltage regulation circuit used for providing a power supply voltage, feedback may be used to regulate the power source voltage. In some situations the battery charging current may cause the external supply voltage to drop below a safe minimum voltage and the voltage regulation circuit may not be able to react quickly enough to bring the supply voltage back to the desired level in a timely manner. This is because the slew rate of the input voltage may be beyond the bandwidth of the feedback loop and occurs more quickly than the feedback can sense the voltage drop and then recover the large voltage drop before the device powers down due to a power supply fault.

Therefore, a need exists for a voltage regulation circuit that can supply a circuit load while charging a battery that solves the above problems.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
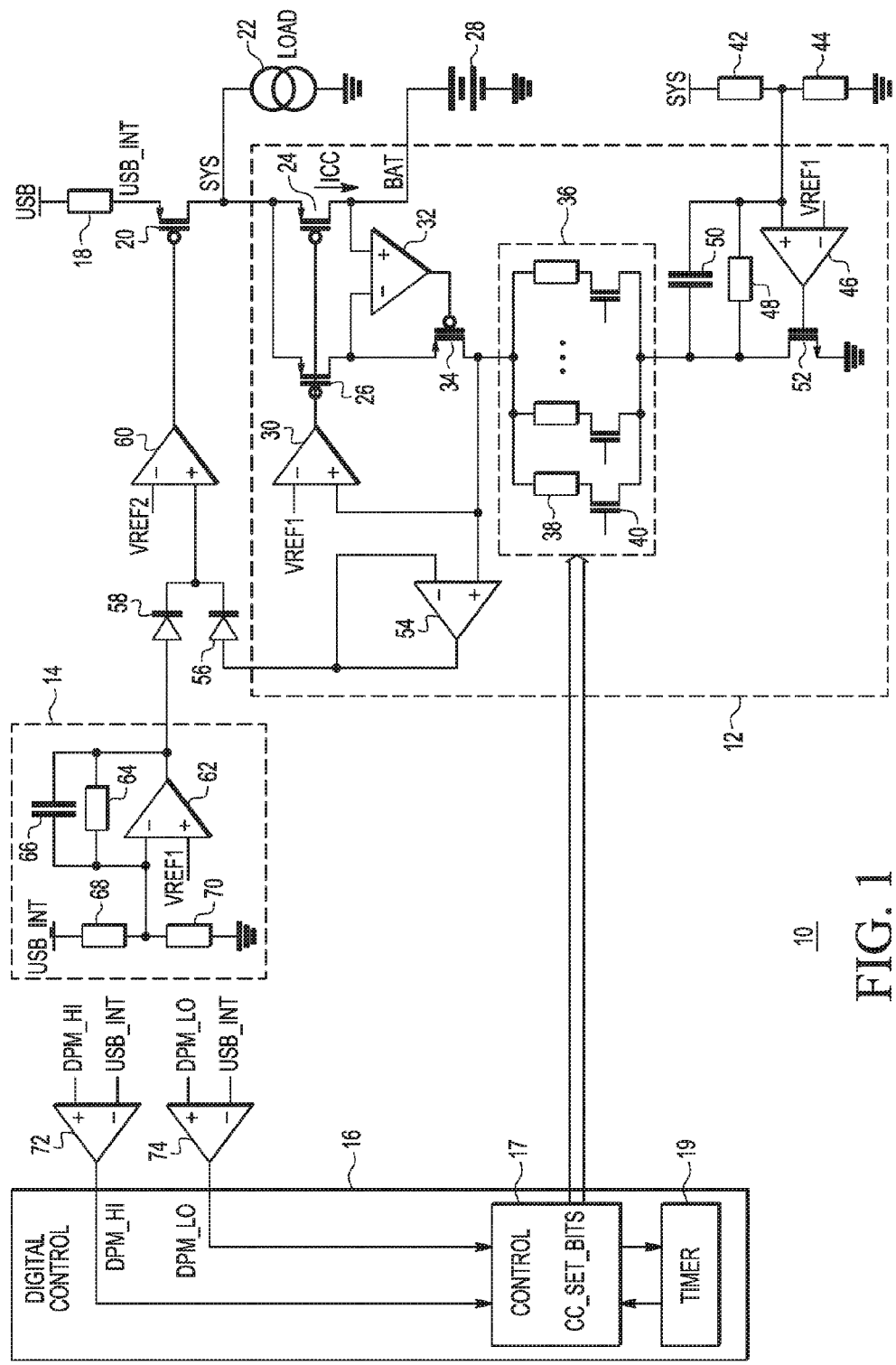
FIG. 1 illustrates, in partial block diagram form and partial schematic diagram form, a regulation circuit in accordance with an embodiment.

Generally, there is provided, a regulation circuit for a battery powered device. The regulation circuit includes a battery charging capability for recharging a battery used to power the device while also managing power provided to power the device in response to receiving an externally provided voltage. The regulation circuit includes at least one analog feedback loop, and a digitally controlled feedback loop. The digitally controlled feedback loop includes first and second comparators. The first and second comparators compare an input power supply voltage to first and second threshold voltages, respectively. The second threshold voltage is lower than the first threshold voltage. In response to the comparisons, the digitally controlled feedback loop controls a charging current for charging a battery while also regulating a current to power circuits of the device. If the input power supply voltage drops, the digitally controlled feedback loop responds faster than the analog feedback loop, reducing the risk that to supply voltage will drop too much to reliably power to the device circuits.

In one embodiment, there is provided, a regulation circuit comprising: a resistive element having a first terminal coupled to a first power supply voltage terminal, and a second terminal coupled to an internal power supply node; a first transistor having a first current electrode coupled to the internal power supply node, a control electrode, and a second current electrode coupled to provide a first current to a circuit load; a second transistor having a first current electrode coupled to the second current electrode of the first transistor, a control electrode, and a second current electrode coupled to provide a second current to charge a battery; a variable resistance having a first terminal coupled to the second current electrode of the second transistor, and a second terminal coupled to a second power supply voltage terminal; a first feedback loop for controlling a conductivity of the first transistor in response to a voltage at the internal power supply node; a second feedback loop for controlling a conductivity of the second transistor in response to a voltage at the battery; and a digital control loop coupled between the internal power supply node and the variable resistance, the digital control loop for reducing the second current to the battery in response to detecting a drop in the voltage of the internal power supply node. The digital control loop, in response to detecting in increase in the voltage of the internal power supply node, may incrementally increase the second current to the battery in discrete steps. The variable resistance may comprise a plurality of parallel-connected switched resistive elements. The digital control loop may be controlled by a state machine. The digital control loop may further comprise: a first comparator having a first input for receiving the voltage at the internal power supply node, a second terminal for receiving a first threshold voltage, and an output coupled to a digital control circuit; and a second comparator having a first input for receiving the voltage at the internal power supply node, a second terminal for receiving a second threshold voltage, and an output coupled to the digital control circuit wherein the second threshold voltage is lower than the first threshold voltage. The digital control loop may reduce the second current to a minimum current in response to the voltage at the internal power supply node dropping below the first and the second threshold voltages. The digital control loop may incrementally increase the second current in response to the voltage at the internal power supply node increasing above the first and the second threshold voltages. The digital control loop may stop incrementally increasing the second current in response to the voltage at the internal power supply node dropping between the first threshold voltage and the second threshold voltage. The first and second feedback loops may function concurrently with the digital control loop.

In another embodiment, there is provided, a method for digitally regulating an output current to charge a battery, the method comprising: comparing a feedback voltage to first and second threshold voltages, wherein the second threshold voltage is lower than the first threshold voltage; determining that the feedback voltage is lower than the first and second threshold voltages; reducing the output current to a minimum current value; determining that the feedback voltage is above the first and second threshold voltages; incrementally increasing the output current above the minimum current value one step at a time; and comparing the feedback voltage to the first and second threshold voltages after each step. The method may further comprise waiting a predetermined amount of time after each step of the one step at a time, and if the feedback voltage is between the first and second threshold voltages, stop incrementally increasing the output current; if the feedback voltage is above the first and second threshold voltages, resume incrementally increasing the output current; and if the feedback voltage drops below the second threshold stop incrementally increasing the output current and reset the output current to the minimum current value. The output current is provided by a transistor coupled to a power supply voltage terminal, the method further comprising: using an analog feedback loop for controlling a conductivity of the transistor concurrently with method for digitally regulating the output current. The step of incrementally increasing the output current may further comprise incrementally increasing the output current by changing a resistance value of a plurality of parallel-connected resistive elements. The feedback voltage may be derived from a power supply voltage provided to supply the output current used to charge the battery. The method may further comprise providing a second output current to supply a circuit load while providing the output current to charge the battery.

In yet another embodiment, there is provided, a method for regulating an output current through a resistive element in series-connection with a first transistor, the output current being provided to supply a first current to a circuit load and a second current to charge a battery, the method comprising: determining that a voltage at the resistive element is lower than a reference voltage; activating an analog feedback loop for controlling a conductivity of a second transistor to decrease the output current; determining that the voltage at the resistive element is lower than a first threshold voltage and a second threshold voltage, wherein the second threshold voltage is lower than the first threshold voltage; reducing the second current to a predetermined minimum current; determining that the voltage at the resistive element is higher than the first threshold voltage; and incrementally increasing the second current from the minimum current to a predetermined target current in discrete steps. The method may further comprise: while incrementally increasing the second current, detecting that the voltage at the resistive element is between the first threshold voltage and the second threshold voltage; stopping the incrementally increasing the second current at an intermediate current; detecting that the voltage at the resistive element is above the first threshold voltage; and resuming the incrementally increasing of the second current in steps to the predetermined target current. The step of incrementally increasing the second current may further comprise: setting bits in a digital control circuit to select a resistance value in a current path of the second current. The method may further comprise: monitoring a voltage at the circuit load; detecting that the voltage at the circuit load has dropped below a predetermined minimum voltage; and reducing the second current. The method may further comprise: while incrementally increasing the second current, detecting that the voltage at the resistive element is below the second threshold voltage; determining that the voltage at the resistive element is lower than the first threshold voltage and the second threshold voltage; and reducing the second current to the predetermined minimum current.

FIG. 1 illustrates, in partial block diagram form and partial schematic diagram form, regulation circuit 10 in accordance with an embodiment. Regulation circuit 10 provides a first current for supplying a circuit load 22 at an output terminal labeled "SYS", and a second current for charging a battery 28 at an output terminal labeled "BAT". Regulation circuit 10 includes first feedback loop 12, second feedback loop 14, digital control 16 for a digitally controlled feedback loop, resistive elements 18, 42, and 44, P-channel transistor 20, amplifier 60, diodes 56 and 58, and comparators 72 and 74. First feedback loop 12 includes P-channel transistors 24, 26, and 34, N-channel transistor 52, amplifiers 30, 32, 46, and 54, resistive element 48, capacitor 50, and variable resistance 36. Second feedback loop 14 includes amplifier 62 resistive elements 64, 68, and 70, and capacitor 66. Variable resistance 36 includes a plurality of switched parallel-connected resistive elements, such as for example, resistive element 38 and N-channel transistor 40. A gate of each of the N-channel transistors in variable resistance 36 is coupled to receive a control bit from digital control 16. First feedback loop 12 and second feedback loop 14 may be characterized as being analog feedback loops.

In regulation circuit 10, an input power supply voltage labeled "USB" may be coupled to receive an external power supply voltage. In one embodiment, the external power supply voltage may be in accordance with the universal serial bus (USB) standard. In another embodiment, the external power supply voltage may be different and may be provided from a variety of sources. In a typical battery powered mobile device, such as a smart phone or tablet computer, the external power supply provides a first current to power the device while also providing a second current for charging the internal battery of the device. Regulation circuit 10 controls the first and second currents as described herein.

In regulation circuit 10, resistive element 18 is connected in series with P-channel transistor 20 between power supply voltage terminal USB and output terminal SYS. Resistive element 18 has a first terminal connected to USB, and a second terminal connected to an internal node labeled "USB_INT". Resistive element 18 is a series resistor on the USB power supply input path. Some embodiments may not have resistive element 18. P-channel transistor 20 has a source connected to the second terminal of resistive element 18, a gate, and a drain connected to output terminal SYS. Load 22 may be a circuit load from a device having a rechargeable battery. Load 22 is connected between output terminal SYS and a power supply terminal connected to ground. P-channel transistor 24 and P-channel transistor 26 are connected in parallel between output terminal SYS and an output terminal labeled "BAT". P-channel transistor 24 has a drain/source current labeled "ICC" for charging battery 28. Amplifier 32 has a first input connected to the drain of P-channel transistor 24, a second input connected to the drain of P-channel transistor 26, and an output. P-channel transistor 34 has a source connected to the drain of P-channel transistor 26, a gate connected to the output of amplifier 32, and a drain. Variable resistance 36 has a first terminal connected to the drain of P-channel transistor 34, and a second terminal. Resistive elements 42 and 44 are connected together to form a voltage divider. Resistive element 42 has a first terminal connected to output terminal SYS, and a second terminal. Resistive element 44 has a first terminal connected to the second terminal of resistive element 42, and a second terminal connected to ground. Amplifier 46 has a first input connected to the second terminal of resistive element 42, a second input for receiving a reference voltage labeled "VREF1", and an output. N-channel transistor 52 has a drain connected to the second terminal of variable resistance 36, a source connected to ground, and a gate connected to the output of amplifier 46. Capacitor 50 and resistive element 48 are connected in parallel between the first input of amplifier 46 and the drain of N-channel transistor 52. Amplifier 30 has a first input for receiving reference voltage VREF1, a second input connected to the first terminal of variable resistance 36, and an output connected to the gates of P-channel transistors 24 and 26. Amplifier 54 has a first input connected to the output of amplifier 54, and a second input connected to the first terminal of variable resistance 36. Diode 56 has a first terminal connected to the output of amplifier 54, and a second terminal. Diode 58 has a first terminal connected to the output of amplifier 62 in second feedback loop 14, and a second terminal. Amplifier 60 has a first input connected to the second terminals of diodes 56 and 58, a second input for receiving reference voltage VREF2, and an output connected to the gate of P-channel transistor 20. Amplifier 60 is shared between first feedback loop 12 and second feedback loop 14. Also, Amplifier 30 and P-channel transistor form another feedback loop within first feedback loop 12. Reference voltage VREF2 differs from reference voltage VREF1 by one diode voltage drop because of the voltage drop across diodes 56 and 58. In other embodiments, reference voltages VREF1 and VREF2 may be different or the same.

In second feedback loop 14, Resistive elements 68 and 70 are connected together to first a voltage divider. Resistive element 68 has a first terminal connected to internal node USB_INT, and a second terminal. Resistive element 70 has a first terminal connected to the second terminal of resistive element 68, and a second terminal connected to ground. Amplifier 62 has a first input connected to the second terminal of resistive element 68, a second input for receiving reference voltage VREF1, and an output connected to the first terminal of diode 58. Resistive element 64 has a first terminal connected to the output of amplifier 62, and a second terminal connected to the first input of amplifier 62. Capacitor 66 has a first terminal connected to the output of amplifier 62, and a second terminal connected to the first input of amplifier 62.

A digitally controlled feedback loop is formed by comparators 72 and 74 and digital control circuit 16. Digital control circuit 16 includes control circuit 17 and timer 19. The digitally controlled feedback loop may be part of a power management system for controlling power distribution to various parts of an integrated circuit having regulation circuit 10. Comparator 72 has a first input connected to receive a high threshold voltage labeled "DPM_HI", a second input connected to internal node USB_INT, and an output connected to an input of control circuit 17. Comparator 74 has a first input connected to receive a low threshold voltage labeled "DPM_LO", a second input connected to internal node USB_INT, and an output connected to an input of control circuit 17. High threshold voltage DPM_HI is at a relatively higher voltage level than low threshold voltage DPM_LO, where DPM refers to dynamic power management. Control circuit 17 has a plurality of output terminal for providing a plurality of bits to control the gates of variable resistance 36. In one embodiment, control circuit 17 includes a state machine. Timer 19 is bi-directionally connected to control circuit 17 for programming the wait periods that will be described below. In other embodiments, digital control circuit 16 may be implemented differently.

The analog first and second feedback loop function to control device current and charging current as follows. A current through P-channel transistor 20 is divided between supplying load 22 and charging battery 28. The current for both is provided through P-channel transistor 20. P-channel transistor 24 provides the current ICC charging battery 28. P-channel transistors 24 and 26 are the same type of PMOS transistors except that P-channel transistor 26 is smaller with a size ratio of 1:100,000. P-channel transistor 26 senses the charging current ICC and its drain/source voltage is used to regulate the gate voltage of P-channel transistor 24. Amplifier 32 and P-channel transistor 34 cause the drain voltage of P-channel transistors 24 and 26 to be substantially equal so that the current through P-channel transistor 26 is 1:100,000 that through P-channel transistor 24. In other embodiments, the current ratio may be different. The current through P-channel transistor 26 also flows through variable resistance 36 so that the voltage at the drain of P-channel transistor 34 is input to amplifier 30 to regulate the gate of P-channel transistor 24. If the current through P-channel transistor 24 increases, the current through P-channel transistor 26 will also increase. Then the voltage at the drain of P-channel transistor 34 will increase so that the gate voltage of P-channel transistor 24 will increase causing P-channel transistor 24 to be less conductive, thus lowering the current. Amplifier 54 is connected to operate as a unity gain amplifier. Continuing the above example of increased current through P-channel transistor 24, the increased voltage at the drain of P-channel transistor 34 will cause the output of amplifier 60 to increase, thus decreasing the current provided by P-channel transistor 20.

N-channel transistor 52 is driven by amplifier 46. Normally, N-channel transistor is fully on and conductive. If the voltage at output terminal SYS drops below VREF1, the output of amplifier 46 will decrease causing N-channel transistor 52 to be less conductive and charge current ICC to be lower.

If load 22 increases, the voltage at internal node USB_INT will drop. When the voltage at the first input of amplifier 62 of second feedback loop 14 is below VREF1, the output of amplifier 62 will increase. The increased output of amplifier 62 cause the second input of amplifier 60 to increase, thus the voltage at the gate of P-channel transistor 20 will increase causing the drain/source resistance of P-channel transistor 20 to increase causing the voltage at output terminal SYS to drop. When the voltage at output terminal SYS drops below VREF1, the resistance of N-channel transistor 52 will increase and charge current ICC will decrease. By reducing charge current ICC, the current for supplying device power at output terminal SYS can be maintained at the intended current value.

The response time of the analog first and second loops is relatively slow due to low bandwidth of the analog circuits. If the input power supply voltage USB drops too quickly, the analog circuits may not be able to keep up. To prevent a possible system crash because of low voltage, the digital control circuit 16 and comparators 72 and 74 provide faster response time for reducing charge current than the analog circuits. The charge current is controlled by controlling a resistance value of variable resistance 36 by comparing the USB_INT voltage with two threshold voltages. In a system where the voltage level of USB is equal to about 5.0 volts, threshold voltage DPM_HI may be about 4.6 volts and threshold voltage DPM_LO may be about 4.4 volts. In other embodiments, the supply voltage and threshold voltage may be different.

A purpose of the digitally controlled feedback loop is to decrease the charge current if the USB voltage drops to preserve the current to load 22. Assuming voltage USB_INT starts at a predetermined target voltage, then voltage USB_INT is greater than both threshold voltages, and the digitally controlled feedback loop does not take an action. If the feedback voltage drops below the second threshold, then digital control circuit 16 changes the resistance value of variable resistance 36 to set the charge current to a minimum current value. If voltage USB_INT increases above the first threshold voltage DPM_HI, then digital control circuit 16 will cause charge current ICC to incrementally increase in steps, when a pause, or wait period between each step. If USB_INT drops between the threshold voltage DPM_HI and DPM_LO, the digital control circuit 16 causes charge current ICC to stop incrementally increasing and wait. If USB_INT again increases above DPM_HI, then the current stepping operation will resume. However, if USB_INT again drops below threshold voltage DPM_LO, then the charge current will be reduced to the minimum current value until USB_INT again increases above threshold voltage DPM_HI.

Figure 2:
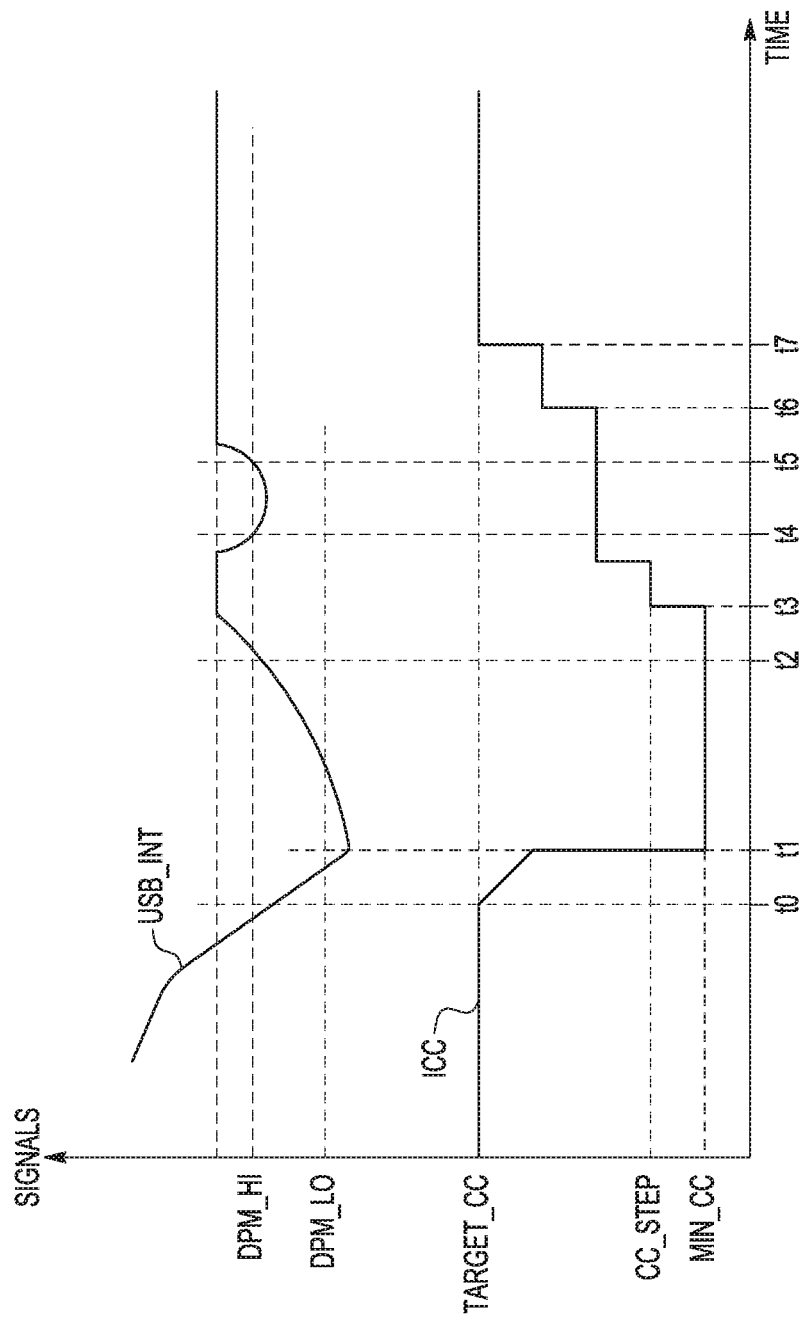
FIG. 2 illustrates a waveform of input power supply voltage versus battery charging output current in the regulation circuit of FIG. 1.

FIG. 2 illustrates a waveform of input power supply voltage USB_INT versus battery charging output current ICC in regulation circuit 10. FIG. 2 illustrates an example scenario of the operation of the digitally controlled feedback loop of FIG. 1. Prior to time t0, voltage USB_INT dropping from a nominal valve above threshold voltage DPM_HI and regulation circuit 10 maintains charge current ICC at a target current value labeled "TARGET_CC". From time t0 and t1, voltage USB_INT has dropped below both threshold voltages DPM_HI and DPM_LO and digital control circuit 16 causes the resistance value of variable resistance 36 to increase, thus reducing current ICC to a predetermined minimum current illustrated in FIG. 2 as MIN_CC. After time t1, voltage USB_INT begins to increase because of the reduced charge current ICC. Charge current ICC is held at the minimum value until time t2 when voltage USB_INT has increased about threshold voltage DPM_HI. At time t2, the digitally controlled feedback loop will begin stepping up charge current ICC in steps after a predetermined delay. Also, each step up will be followed by the predetermined delay. In the illustrated embodiment, the predetermined delay is about 10 milliseconds (mS). In another embodiment the predetermined delay may be different. Charge current ICC is increased reducing the resistance value of variable resistance 36 so that sensing P-channel transistor 26 has a reduced resistance to current flow as provided by amplifier 30 and P-channel transistor 34. The charge current ICC through P-channel transistor 24 will follow the current through P-channel transistor 26. The resistance of variable resistance 36 is changed by charge current control bits CC_SET_BITS. In one embodiment, the resistance of each resistive element of variable resistance 36 is binary weighted based on its bit position. In other embodiments, variable resistance 36 can be implemented differently.

Referring back to FIG. 2, at time t4, internal node voltage USB_INT drops between threshold voltage DPM_HI and DPM_LO. Charge current ICC will stop stepping up and hold at its current value. At time t5, voltage USB_INT increases above DPM_HI and the stepping up of charge current ICC resumes after the predetermined delay between times t5 and t6. At time t7 charge current ICC has increased to the target current value TARGET_CC and the stepping up stops. The internal voltage USB_INT is monitored by comparators 72 and 74 and digital control circuit 16. If the internal voltage USB_INT drops below threshold voltage DPM_LO, charge current ICC will again be reduced to the MIN_CC. In one embodiment target charge current TARGET_CC is about 500 milliamps (mA) and minimum charge current MIN_CC is about 100 mA. In another embodiment, TARGET_CC and MIN_CC may be different.

Figure 3:
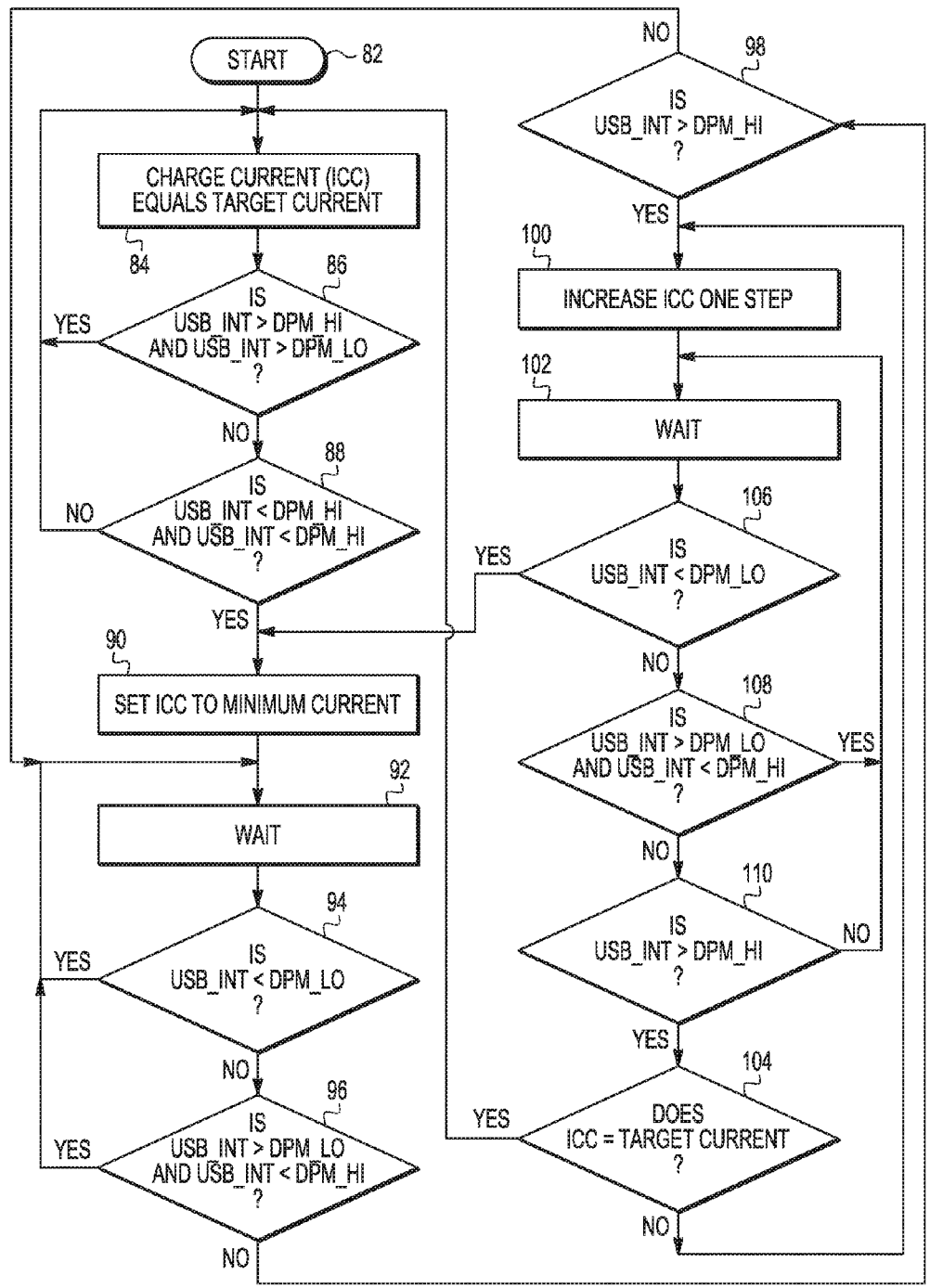
FIG. 3 illustrates a method of regulating an output current in accordance with an embodiment.

FIG. 3 illustrates method 80 for regulating a charge current using regulation circuit 10 in accordance with an embodiment. The method is described in the context of an example scenario for the purposes of simplicity and clarity. Step 82 indicates a start point for the method. At step 84, the charge current ICC is at the target charge current. At decision steps 86 and 88, internal voltage USB_INT is monitored using comparators 72 and 74 and digital control circuit 16. If internal voltage USB_INT stays above threshold voltage DPM_HI, the YES path is taken back to step 84. If USB_INT drops below one of the threshold voltage, the NO path is taken to decision step 88. At decision step 88, if USB_INT is above one of the threshold voltages, the method returns to step 84 and nothing happens. If USB_INT is below both threshold voltages, the YES path is taken to step 90. At step 90, charge current ICC is set to a pre-established minimum current. At step 92, a wait period is built in. In the illustrated embodiment, the wait period is about 10 mS. After the wait period, at decision step 94, the voltage level of USB_INT is checked. If USB_INT Is still below DPM_LO, the YES path is taken back to step 92. If USB_INT is above threshold DPM_LO, the NO path is taken to decision step 96. At decision step 96, it is determined if USB_INT is between threshold voltages DPM_HI and DPM_LO. If USB_INT is between the two threshold voltages, the YES path returns to step 92 and step 92 and decision steps 94 and 96 are repeated. If at decision step 96, it is determined that USB_INT is not between the two threshold voltages, the NO path is taken to decision step 98. At decision step 98, it is determined if voltage USB_INT is above threshold voltage DPM_HI. If voltage USB_INT is not above threshold voltage DPM_HI, the method returns to step 92. If voltage USB_INT is above threshold voltage DPM_HI, the YES path is taken to step 100 and charge current ICC is incrementally stepped up from the minimum current MIN_CC by one step. At step 102, the method waits the predetermined time period and then proceeds to decision step 106. At decision step 106 it is determined if voltage USB_INT is below threshold voltage DPM_LO. If USB_INT is below DPM_LO, then the YES path is taken to step 90. If USB_INT is not below DPM_LO, the NO path is taken to decision step 108. At decision step 108, it is determined if USB_INT is between the threshold voltages DPM_LO and DPM_HI. If the answer is YES, then the YES path is taken back to step 102. If at decision step 108 the answer is NO, the NO path is taken to decision step 110. At decision step 110, it is determined if USB_INT is above DPM_HI. If the answer is NO, the NO path is taken back to step 102. If the answer is YES, the YES path is taken to decision step 104. At decision step 104 it is determined if the charge current equals the target current TARGET_CC. If NO, the NO path is taken back to step 100 because charge current ICC needs to be increased one or more additional steps. If the target current TARGET_CC has been reached, then the method returns to step 84. In the illustrated embodiment, the method continues to regulate the charge current ICC for charging a battery while the device is on and an external voltage is applied to the device. In other embodiments, the method may be enabled or disabled as necessary by, for example, a power management controller.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims. Generally, in the above described embodiment, a current electrode is a source or drain and a control electrode is a gate of a metal-oxide semiconductor (MOS) transistor. Other transistor types may be used in other embodiments.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A regulation circuit comprising:
   a resistive element having a first terminal coupled to a first power supply voltage terminal, and a second terminal coupled to an internal power supply node;
   a first transistor having a first current electrode coupled to the internal power supply node, a control electrode, and a second current electrode coupled to provide a first current to a circuit load;
   a second transistor having a first current electrode coupled to the second current electrode of the first transistor, a control electrode, and a second current electrode coupled to provide a second current to charge a battery;
   a variable resistance having a first terminal coupled to the second current electrode of the second transistor, and a second terminal coupled to a second power supply voltage terminal;
   a first feedback loop for controlling a conductivity of the first transistor in response to a voltage at the internal power supply node;
   a second feedback loop for controlling a conductivity of the second transistor in response to a voltage at the battery; and
   a digital control loop coupled between the internal power supply node and the variable resistance, the digital control loop for reducing the second current to the battery in response to detecting a drop in the voltage of the internal power supply node.

2. The regulation circuit of claim 1, wherein the digital control loop, in response to detecting in increase in the voltage of the internal power supply node, incrementally increases the second current to the battery in discrete steps.

3. The regulation circuit of claim 1, wherein the variable resistance comprises a plurality of parallel-connected switched resistive elements.

4. The regulation circuit of claim 1, wherein the digital control loop is controlled by a state machine.

5. The regulation circuit of claim 1, wherein the digital control loop further comprises:
   a first comparator having a first input for receiving the voltage at the internal power supply node, a second terminal for receiving a first threshold voltage, and an output coupled to a digital control circuit; and
   a second comparator having a first input for receiving the voltage at the internal power supply node, a second terminal for receiving a second threshold voltage, and an output coupled to the digital control circuit wherein the second threshold voltage is lower than the first threshold voltage.

6. The regulation circuit of claim 5, wherein the digital control loop will reduce the second current to a minimum current in response to the voltage at the internal power supply node dropping below the first and the second threshold voltages.

7. The regulation circuit of claim 6, wherein the digital control loop will incrementally increase the second current in response to the voltage at the internal power supply node increasing above the first and the second threshold voltages.

8. The regulation circuit of claim 7, wherein the digital control loop will stop incrementally increasing the second current in response to the voltage at the internal power supply node dropping between the first threshold voltage and the second threshold voltage.

9. The regulation circuit of claim 1, wherein the first and second feedback loops function concurrently with the digital control loop.

10. A method for digitally regulating an output current to charge a battery, the method comprising:
    comparing a feedback voltage to first and second threshold voltages, wherein the second threshold voltage is lower than the first threshold voltage;
    determining that the feedback voltage is lower than the first and second threshold voltages;
    reducing the output current to a minimum current value;
    determining that the feedback voltage is above the first and second threshold voltages;
    incrementally increasing the output current above the minimum current value one step at a time; and
    comparing the feedback voltage to the first and second threshold voltages after each step.

11. The method of claim 10, further comprising waiting a predetermined amount of time after each step of the one step at a time, and if the feedback voltage is between the first and second threshold voltages, stop incrementally increasing the output current; if the feedback voltage is above the first and second threshold voltages, resume incrementally increasing the output current; and if the feedback voltage drops below the second threshold stop incrementally increasing the output current and reset the output current to the minimum current value.

12. The method of claim 10, wherein the output current is provided by a transistor coupled to a power supply voltage terminal, the method further comprising:

using an analog feedback loop for controlling a conductivity of the transistor concurrently with method for digitally regulating the output current.

13. The method of claim 10, wherein incrementally increasing the output current further comprises incrementally increasing the output current by changing a resistance value of a plurality of parallel-connected resistive elements.

14. The method of claim 10, wherein the feedback voltage is derived from a power supply voltage provided to supply the output current used to charge the battery.

15. The method of claim 10, further comprising providing a second output current to supply a circuit load while providing the output current to charge the battery.

16. A method for regulating an output current through a resistive element in series-connection with a first transistor, the output current being provided to supply a first current to a circuit load and a second current to charge a battery, the method comprising:
   determining that a voltage at the resistive element is lower than a reference voltage;
   activating an analog feedback loop for controlling a conductivity of a second transistor to decrease the output current;
   determining that the voltage at the resistive element is lower than a first threshold voltage and a second threshold voltage, wherein the second threshold voltage is lower than the first threshold voltage;
   reducing the second current to a predetermined minimum current;
   determining that the voltage at the resistive element is higher than the first threshold voltage; and
   incrementally increasing the second current from the minimum current to a predetermined target current in discrete steps.

17. The method of claim 16, further comprising:
   while incrementally increasing the second current, detecting that the voltage at the resistive element is between the first threshold voltage and the second threshold voltage;
   stopping the incrementally increasing the second current at an intermediate current;
   detecting that the voltage at the resistive element is above the first threshold voltage; and
   resuming the incrementally increasing of the second current in steps to the predetermined target current.

18. The method of claim 16, wherein the incrementally increasing the second current further comprises:
   setting bits in a digital control circuit to select a resistance value in a current path of the second current.

19. The method of claim 16, further comprising:
   monitoring a voltage at the circuit load;
   detecting that the voltage at the circuit load has dropped below a predetermined minimum voltage; and
   reducing the second current.

20. The method of claim 16, further comprising:
   while incrementally increasing the second current, detecting that the voltage at the resistive element is below the second threshold voltage;
   determining that the voltage at the resistive element is lower than the first threshold voltage and the second threshold voltage; and
   reducing the second current to the predetermined minimum current.

* * * * *